United States Patent

[11] 3,616,315

[72] Inventor William V. Childs
 Austin, Tex.
[21] Appl. No. 6,836
[22] Filed Jan. 29, 1970
[45] Patented Oct. 26, 1971
[73] Assignee Phillips Petroleum Company

[54] INDUCING AND/OR ELIMINATING POLARIZATION IN ONE CELL OF A SERIES OF CELLS IN OPERATION
3 Claims, 1 Drawing Fig.

[52] U.S. Cl. .................................................. 204/60,
 204/67, 204/228
[51] Int. Cl. ........................................................ B01k 1/00,
 C22d 3/12
[50] Field of Search .......................................... 204/60, 67,
 228

[56] References Cited
UNITED STATES PATENTS
| | | | |
|---|---|---|---|
| 2,540,248 | 2/1951 | Downing | 204/60 |
| 2,651,613 | 9/1953 | Fowler et al. | 204/60 X |
| 2,939,824 | 6/1960 | Greenfield | 204/67 |
| 3,539,461 | 11/1970 | Newman et al. | 204/67 |

OTHER REFERENCES
Rudge, " Influence of Anode Material and Electrolyte Purity on Fluorine Cell Performance," Chemistry and Industry, No. 12, Mar. 19, 1966, pp. 482– 488.

*Primary Examiner*—John H. Mack
*Assistant Examiner*—D. R. Valentine
*Attorney*—Young and Quigg ABSTRACT: A procedure for inducing anode effect or polarization by subjecting an anode in a cell, in a series of cells in operation, and being subjected to a main electrical current power supply source, capable of delivering current for said operation at higher than normal voltages across at least one cell in said series, to a higher than normal current density by supplying additional current to said cell from an auxiliary or secondary current or power supply connected to and across said cell in parallel and then discontinuing current supply from said auxiliary supply, thus eliminating the anode effect induced in said cell by thus subjecting the same to a higher than normal voltage. By starting each or less than all of the cells at a time in a series of cells, the anode effect will usually occur in a cell at a time or in less than all of the cells at a time, thus lessening the strain of a number of cells polarizing simultaneously. When an increased cell voltage or voltage oscillations of increased frequency occur across a cell, it is about ready for depolarization and the recited procedure can be applied.

PATENTED OCT 26 1971
3,616,315
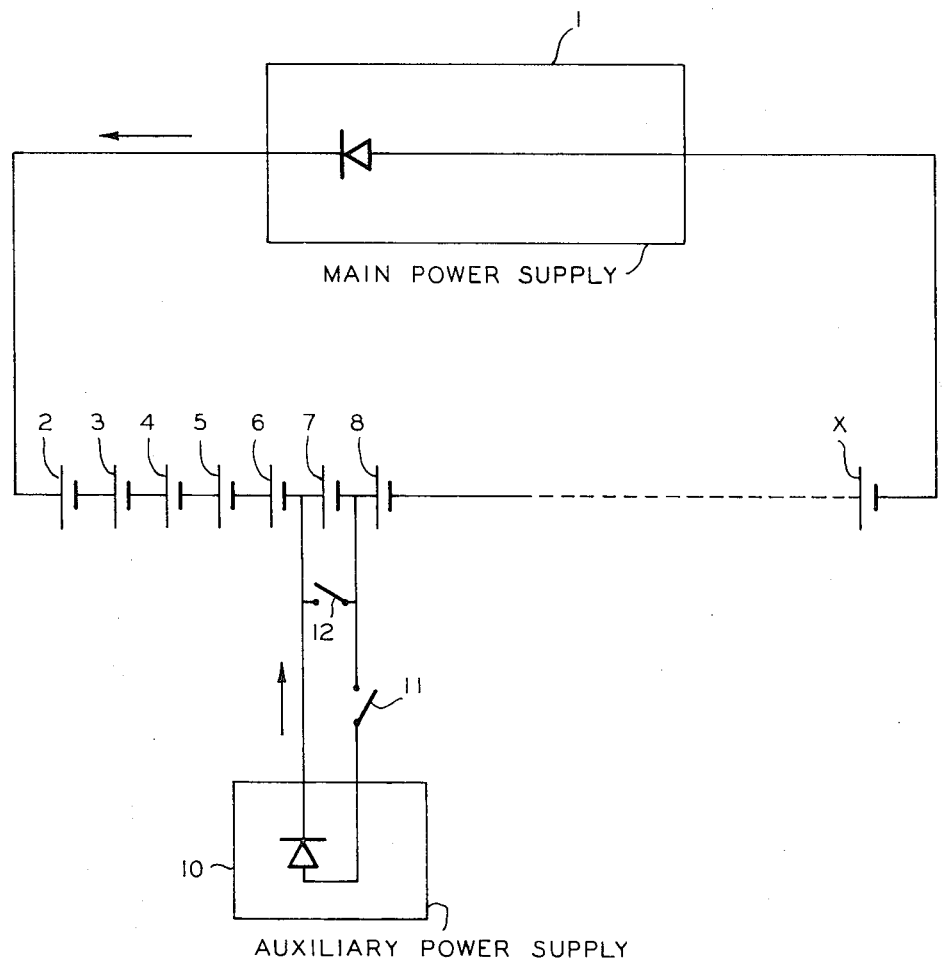

INDUCING AND/OR ELIMINATING POLARIZATION IN ONE CELL OF A SERIES OF CELLS IN OPERATION

This invention relates to the operation of electrochemical cells, e.g., an electrochemical operation for fluorination of, say, a hydrocarbon or a derivative thereof, e.g., a chlorinated hydrocarbon, an alcohol, a nitrile or other organic material or compound. It also relates to an electrical circuitry adapted to effect the method or operation.

In one of its aspects the invention relates to polarization and depolarization of an anode in a cell. Such polarization is frequently called anode effect.

In one of its concepts the invention provides an operation for advantageously utilizing anode effect, in an electrochemical conversion process, in one or more, but not all, of the cells in a cell series operation or in one or more or all cells in such operation in a sequential manner by subjecting at least one of each of said cells to a higher than normal current density to deliberately induce anode effect and later to restore normal operation.

In another of its concepts the invention provides an electrical circuitry with which it is possible to polarize and then depolarize at least one cell in a series of cells in operation without affecting the remaining cells, the circuitry including an additional power supply adapted to furnish additional current across said cell in one embodiment the additional power supply being connected with and through said cell in parallel to the main power supply so that only the cell or cells desired to be treated will receive the additional current.

Anode effect is a complex, only partially understood phenomenon, which occurs intermittently in many electrochemical processes. Generally speaking, anode effect is a condition which occurs at the anode and which, for all practical purposes, causes the anode to cease operating. The occurrence of anode effect generally requires a corrective action which must be taken to bring the system back to normal operating conditions and yields of desired product. Anode effect has been observed in a wide variety of electrolytic cells employing a variety of electrolytes and anode types. For example, it has been observed in cells employing molten salt electrolytes, such as KF·2HF, and various types of anodes including porous carbon anodes. Anode effect has also been observed in cells having fused salt electrolytes containing halides of lead, silver, cadmium, alkali metals, alkaline earth metals, magnesium, aluminum, and complex electrolytes of aluminum fluorides.

Generally speaking, in the prior art anode effect has been considered highly undesirable, and much effort has been expended to eliminate or at least reduce the frequency of its occurrence.

The advantageous utilization of anode effect is set forth and described and claimed in Ser. No. 733,486, filed May 31, 1968, William V. Childs and Forrest N. Ruehlen. In that application, the disclosure of which is incorporated herein by reference, there is set forth a method of conditioning an anode for improved operation in an electrolysis process normally carried out by passing an electric current, at current density and voltage values normal for said process, through a molten electrolyte contained in an electrolytic cell having an anode and a cathode disposed in said electrolyte, which method comprises; subjecting said anode to an abnormally high current density for a period of time sufficient to deliberately induce anode effect at said anode; and then subjecting said anode to an abnormally high voltage for a period of time sufficient to eliminate said anode effect.

The present invention is concerned with improving the operation of, say, one of several cells operating jointly as in series without disturbing the operation of the remaining cells. Each such cell can contain one or more anodes. When multiple anodes are used per cell, they are connected in parallel within the cell and are for purposes of this invention, considered as one large anode per cell.

It has occurred to me that there can be supplied to a cell in such operation, as herein set forth, auxiliary power from an additional electrical power supply by connecting said additional power supply across the cell independently from that normally supplied to the cell in the operation of the series of cells. Thus, a polarization-depolarization cycle is induced by connecting an auxiliary power supply across the cell in question in parallel, in respect to that cell, with the main power supply and thusly increasing the current passing through the selected cell to the desired value. The time to supply such auxiliary power can be determined by routine testing, say, of cell effluent for undesired by-products. Alternatively, the voltage across the cell can be watched visually or automatically and the procedure of the invention applied whenever unsatisfactory operation evidenced by increased cell voltage and voltage oscillations of increasing frequency. Such symptoms indicate that a particular cell is undergoing "incipient polarization" and is in a condition to greatly benefit from the process of this invention.

In a plant scale operation in which the normal current through an entire series of cells is, say, about 30,000 amperes, about 15,000 amperes added to the cell for a total of about 45,000 amperes will induce polarization in a cell in such condition by generally applying less than about 20 volts on the auxiliary supply. The voltage the main supply can deliver will usually be about 300 to 360 volts in the example discussed. Although anode effect or polarization refers to a condition of a anode, it is sometimes referred to as a condition of a cell which contains such an anode.

After the anode effect has been induced, usually accomplished in a short period of time, say, about 0.1 to about 10 minutes, or more, when the required current density level has been reached, the auxiliary power is turned off and the main power supply, being automatically controlled to maintain a constant current level, then will proceed with the depolarization stage. To maintain its prescribed current level the main power supply will increase its voltage output to provide a voltage level at that particular cell which can be three-10 times its normal voltage and sufficient to effect depolarization of the anode.

The normal voltage drop across the cell, in the example as here discussed, will usually be of the order of about 8 volts. When the auxiliary supply of power is turned off, the main supply will usually, in the case here described, depolarize the cell at about 40–60 volts. The entire operation is then completed by decreasing the cell voltage to normal. By momentarily shorting out the thus treated cell, the auxiliary power being turned off, the anode is then in a condition to "break loose," that is to say, to drop back to its normal voltage of about 8 volts.

Thus, a typical porous carbon anode, for example, is depolarized by sufficient voltage to maintain a current density sufficient to supply considerable power to the anode/electrolyte interface. This is generally 200 to 300 ma./cm.$^2$ at 45 to 60 volts for about 3 minutes. When such an anode is polarized, 40 volts is generally not enough to push enough current through the interface. When a cell is in a state of "incipient polarization" it can be forced to polarize, earlier than it would otherwise, by running at a higher than normal current density. This phenomenon, polarization in the cell, is a special case of the anode effect noted generally in fused salt electrolysis. As an electrode is run, the electrode surface is fouled or poisoned and the electrochemically effective surface area diminishes. If the net current remains constant (and this is the usual procedure), the true current density increases until it reaches the critical current density and the cell becomes polarized. The cell is depolarized by supplying enough voltage to keep the current constant. (At 200 ma./am.$^2$ this can be, for example, Ca 50 volts.) As a result, considerable power, 8–10 watts/cm.$^2$, is concentrated near the anode surface and the fouled surface thermally stripped off and a clean surface results. Initially, the high voltage is required because of the fouled surface. After the cell has been run at this high power, it sometimes is observed to "break loose" spontaneously and drop to a normal low voltage. Frequently, however, the voltage will remain high for extended periods. In one case this high voltage was maintained accidentally for several hours. This can be attributed to a "Leidenfrost" type phenomenon where the high power dissipation vaporizes the electrolyte near the anode and the pressure of the vapor pushes the anode and electrolyte apart to maintain the poor contact and high voltage. When "breaking loose" is observed, a strong fluctuation appears to quench this, and the Leidenfrost film breaks down and normal anode-electrolyte contact is established. Consequently, the final step in the depolarization, namely the return to normal cell voltage, must generally be initiated by momentarily shorting out the cell in question.

The invention can be practiced on a cell which is just beginning to operate to condition the anode accordingly, as when a new cell is placed into the series to replace an old one or to augment the series of cells.

It is an object of the present invention to provide an electrochemical cell operation. It is a further object of the invention to provide for selective treatment of a cell in a group of cells which are in operation performing an electrochemical treatment. It is a further object of the invention to provide a method for selectively conditioning an anode in a cell in a group of cells thus to improve the operation of said cell to reduce or avoid the production of undesirable by-products. It is a still further object to provide a method for reducing the voltage required for the operation of a cell in a group of cells without disturbing the operation in the remaining cells of the group. Another object of the invention is to provide for the improved electrochemical treatment of an organic compound, e.g., the fluorination of such a compound, for example, fluorination of ethylene dichloride. Still another object of the invention is to provide means for effecting said conditioning of said cell.

Other aspects, concepts and objects, as well as the several advantages of the invention are apparent from a study of this disclosure, drawing and the appended claims.

According to the present invention a cell in a series of cells operating to perform an electrochemical operation and tending to exhibit anode effect or polarization, as at a porous carbon anode in an electrochemical fluorination of an organic material employing a fused or molten electrolyte, e.g., KF·2HF, is conditioned by subjecting the cell to an additional flow of current, from an auxiliary power supply connected into said cell in parallel with the main supply operating said cell in the series, for a time period adapted to deliberately induce anode effect and then returning the cell to operation with only the main power supply, the main supply being capable of delivering the current utilized in said cell at a voltage higher than that normally required by said cell.

Also according to the invention when the auxiliary power supply has been shutoff, and when the anode has been subjected to a high voltage for a sufficient length of time, the cell is momentarily shorted out from the series so that when the cell has been reinstated in the circuit and the main current supply is again being passed therethrough, the cell and anode are operating at normal voltage and current density.

Further, according to the invention, by placing a series of cells into the operation, either manually or automatically, so that each cell or less than all of the cells in a series starts to operate at different times, it is possible to alternately treat each cell or less than all of them according to the invention at different times, thus reducing the auxiliary power installation requirements and obtaining further benefits such as more continuous flow of products from the series of cells.

Thus, according to the invention the phenomenon of anode effect is deliberately induced either before operation of the cell or sometime thereafter and the marked benefits are obtained as herein evidenced.

Generally speaking, in inducing said anode effect the current density will be increased an amount within the range of from about 25 to about 200 percent of the normal current density. Frequently, an increase within the range of about 25 to about 100 percent will be sufficient. However, there is no real numerical limit on the amount of current density increase. As a general rule, the smaller amounts of current density increase are preferred. Amounts of the current density increase outside the above specified ranges can be employed. The minimum amount is the smallest amount which is necessary to deliberately induce the anode effect. The maximum amount will be limited by the limit of the particular power supply available. The amount of normal current density and the amount of current density increase employed will depend upon the particular system being employed. Some anode materials are more susceptible to anode effect than other materials. For example, a dense porous carbon is more susceptible than a loose or more porous carbon. The period of time during which the anode is subjected to the increased current density will be a period which is just sufficient to induce the anode effect. This period of time will preferably be short, generally from a few seconds to a few minutes, e.g., 0.1 to 10 minutes, as stated, once the required level of increased current density has been reached. Thus, numerically speaking, the period of time to which the anode is subjected to the increased current density can vary over a wide range, including values outside said range.

The amount of voltage increase which is employed to correct the deliberately induced anode effect will usually be within the range of from about three to about 10 times the voltage employed in the normal operation of the cell. The amount of normal voltage and the amount of voltage increase employed will depend upon the particular system being employed. Frequently, said voltage increase will be within the range of about three to about seven times said normal voltage. However, voltages outside said range can also be employed in the practice of the invention. These high voltages are preferably employed in the minimum amount necessary and for the minimum period of time sufficient to eliminate the deliberately induced anode effect. Minimum voltage and minimum time are employed so as to avoid, or reduce to a minimum, increased heating of the cell elements. High voltages will frequently be destructive to the material from which the anode is fabricated, particularly when the anode is fabricated from a porous material such as porous carbon. Said high voltages will usually be applied for a period of time within the range of from about 0.5 to 5, preferably 0.5 to 3, minutes. However, in the practice of the invention said high voltages can be applied for periods of time outside said ranges, if necessary.

The step of deliberately inducing anode effect can be carried out at any time during the operation of the electrochemical process in which the invention is being applied. In one method of operation in accordance with the invention, a combination of four steps is carried out. In general, these four steps are 1. a period of cell operation under normal conditions;
2. the deliberate inducing of anode effect by increasing current density;
3. the elimination of said deliberately induced anode effect by increasing the voltage; and
4. decreasing the cell voltage to a value sufficient to maintain normal current density.

Step (1) is preferably carried out during the first portion of the cell operating time, e.g., within a period of time ranging from 1 or 2 minutes up to about 48 hours. Preferably, in most instances, said deliberately induced anode effect will be carried out during the first 24 hours of cell operation. However, in some instances, it will be desirable to deliberately induce the anode effect at the start of cell operation, i.e., at zero period of time of normal operation. Thus, in some instances, said step (1) can be eliminated. Step (4) can be carried out in more than one manner. One simple method comprises merely opening the electrical circuit which, of course, will cause the voltage to decrease to zero. After a few seconds the cell, if the anode effect has been corrected, will operate at normal current density and usually at a lower voltage level than prior to said anode effect. The other method comprises a reduction of voltage to the desired value without an interruption in current flow.

The invention is applicable to electrochemical processes wherein anode effect occurs. The invention is particularly valuable in the electrochemical fluorination of organic materials using a current-conducting essentially anhydrous hydrogen fluoride electrolyte. For purposes of convenience, and not by way of limitation, the invention will be further described as applied to electrochemical fluorination. Various processes for carrying out electrochemical fluorination reactions are known. In one presently preferred process a current-conducting essentially anhydrous liquid hydrogen fluoride electrolyte is electrolyzed in an electrolysis cell provided with a cathode and a porous anode (preferably porous carbon), a fluorinatable organic compound is introduced into the pores of said anode and at least a portion of said organic compound is at least partially fluorinated within the pores of said anode, and fluorinated compound products are recovered from the cell.

Very few organic compounds are resistant to fluorination. Consequently, a wide variety of feed materials, both normally liquid and normally gaseous compounds, can be used as feedstocks in said process. Organic compounds which are normally gaseous or which can be introduced in gaseous state into the pores of a porous anode under the conditions employed in the electrolysis cell, and which are capable of reacting with fluorine, are presently preferred as starting materials, However, starting materials which are introduced into the pores of the anode in liquid state can also be used. Generally speaking, desirable organic starting materials which can be used are those containing from one to eight, preferably one to six, carbon atoms per molecule. However, reactants which contain more than six or eight carbon atoms can also be used. If desired, suitable feed materials having boiling points above cell operating temperatures can be passed into the pores of the porous anode in gaseous state by utilizing a suitable carrier gas. Thus, a suitable carrier gas can be saturated with the feed reactant (as by bubbling said carrier gas through the liquid reactant) and then passing the saturated carrier gas into the pores of the porous anode. Suitable carrier gases include the inert gases such as helium, argon, krypton, neon, xenon, nitrogen, etc. Perfluorocarbons containing from one to eight, preferably one to four, carbon atoms per molecule such as tetrafluoromethane, hexafluoroethane, perfluoropropane, the perfluorobutanes, the perfluorohexanes, and the perfluorooctanes can also be used as carrier gases. Said carrier gases can also be used as diluents for the feedstocks which are normally gaseous at cell operating conditions. Some general types of starting materials which can be used include, among others, the following:

alkanes,
alkenes,
alkynes,
amines,
esters,
ethers,
mercaptans,
nitriles,
alcohols,
aromatic compounds, and
partially halogenated compounds of both the aliphatic and aromatic series.

It will be understood that the above-named types of compounds can be either straight chain, branched chain, or cyclic compounds. The presently, more preferred, starting materials are the normally gaseous organic compounds, and particularly the saturated and unsaturated hydrocarbons, containing from one to four carbon atoms per molecule.

Since fluorine is so reactive, no list of practical length could include all starting materials which can be used. However, representative examples of the above-described starting materials include, among others, the following:

methane,
ethane,
propane,
butane,
isobutane,
pentane,
n-hexane,
n-octane,
cyclopropane,
cyclopentane,
cyclohexane,
cyclooctane,
1,2-dichloroethane,
b 1-fluoro-2-chloro-3-methylheptane,
ethylene,
propylene,
cyclobutene,
cyclohexene,
2-methylpentene-1,
2,3-dimethylhexene-2,
butadiene,
vinyl chloride,
3-fluoropropylene,
acetylene,
methylacetylene,
vinylacetylene
3,3-dimethylpentyne-2,
allyl chloride,
methylamine,
ethylamine,
diethylamine
2-amino-3-ethylpentane,
3-bromopropylamine
triethylamine,
dimethyl ether,
diethyl ether,
methylethyl ether,
methylvinyl ether,
2-iodoethylmethyl ether
di-n-propyl ether,
methyl formate,
methyl acetate,
ethyl butyrate,
ethyl formate,
N-amyl acetate
methyl 2-chloroacetate,
methyl mercaptan,
ethyl mercaptan,
n-propyl mercaptan,
2-mercaptohexane,
2-methyl-3-mercaptoheptane,
acetonitrile,
propionitrile,
n-butyronitrile,
acrylonitrile,
n-hexanonitrile,
methanol,
ethanol,
isopropanol,
n-hexanol,
2,2-dimethylhexanol-3,
ethylenebromohydrin,
benzene,
toluene,
cumene,
o-xylene,
p-xylene, and
monochlorobenzene.

Inorganic materials such as carbon monoxide and oxygen can also be fluorinated as described herein to yield carbonyl fluoride and oxygen difluoride, respectively. Although the hydrogen fluoride electrolyte can contain small amounts of water, such as up to about 5 weight percent, it is preferred that said electrolyte be essentially anhydrous. Generally speaking, it is preferred that said electrolyte contain not more than about 0.1 weight percent water. However, commercial anhydrous liquid hydrogen fluoride which normally contains dissolved water in amounts ranging from a trace (less than 0.1 weight percent) up to about 1 percent by weight can be used. Thus, as used herein and in the claims, the term "essentially anhydrous liquid hydrogen fluoride," unless otherwise specified, includes liquid hydrogen fluoride which can contain water not exceeding up to about 1 weight percent. As the electrolysis reaction proceeds, any water contained in the hydrogen fluoride electrolyte is slowly decomposed and said electrolyte concomitantly approaches the anhydrous state. The hydrogen fluoride electrolyte is consumed in the reaction and must be either continuously or intermittently placed in the cell.

Pure anhydrous liquid hydrogen fluoride in nonconductive. The essentially anhydrous liquid hydrogen fluorides described above have a low conductivity which, generally speaking, is lower than desired for practical operation. To provide adequate conductivity in the electrolyte, and to reduce the hydrogen fluoride vapor pressure at cell operating conditions, an inorganic additive can be incorporated in the electrolyte. Examples of suitable additives are inorganic compounds which are soluble in liquid hydrogen fluoride and provide effective electrolytic conductivity. The presently preferred additives are the alkali metal (sodium, potassium, lithium, rubidium, and cesium) fluorides and ammonium fluoride. Other additives which can be employed are sulfuric acid and phosphoric acid. Potassium fluoride is the presently most preferred additive. Said additives can be utilized in any suitable molar ratio of additive to hydrogen fluoride within the range of from 1:4.5 to 1:1, preferably 1:4 to 1:2. The presently most preferred electrolytes are those which correspond approximately to the formulas $KF \cdot 2HF$, $KF \cdot 3HF$, or $KF \cdot 4HF$. In general, said additives are not consumed in the process and can be used indefinitely. Said additives are frequently referred to as conductivity additives for convenience.

The electrochemical fluorination can be effectively and conveniently carried out over a broad range of temperatures and pressures limited only by the freezing point and the vapor pressure of the electrolyte. Generally speaking, the fluorination process can be carried out at temperatures within the range of from $-80°$ to $500°$ C. at which the vapor pressure of the electrolyte is not excessive, e.g., less than 250 mm. Hg. It is preferred to operate at temperatures such that the vapor pressure of the electrolyte is less than about 50 mm. Hg. A presently preferred range of temperature is from about $60°$ to about $105°$ C.

Pressures substantially above or below atmospheric can be employed, if desired, depending upon the vapor pressure of the electrolyte as discussed above. In all instances, the cell pressure will be sufficient to maintain the electrolyte in liquid phase. Generally speaking, the process is conveniently carried out at substantially atmospheric pressure. The operating conditions of temperature and pressure within the limitations discussed above are not critical and are essentially independent of the type of feed employed in the process.

The rate of direct current flow through the cell is maintained at a level which will give the highest practical current densities for the electrodes employed. Current densities within the range of from 30 to 1,000, or more, preferably 50 to 500 milliamps per square centimeter of anode geometric surface area can be used. Current densities less than 30 milliamps per square centimeter of anode geometric surface area are not practical because the rate of fluorination is too slow. The voltage which is normally employed will vary depending upon the particular cell configuration employed and current density employed. In all cases, under normal operating conditions, however, the cell voltage or potential will be less than that required to evolve or generate free or elemental fluorine. Voltages in the range of from 4 to 12 volts are typical. The maximum normal voltage will not exceed 20 volts per unit cell. Thus, as a guide, voltages in the range of 4 to 20 volts per unit cell are normally used. The term " anode geometric surface" refers to the outer geometric surface area of the porous carbon element of the anode which is exposed to electrolyte and does not include the pore surfaces of said porous element.

The feed rate and other conditions of operation of an electrochemical cell, exhibiting anode effect, are incidental to the present invention which has as a basic concept thereof the treatment of a cell in a series of cells to prepare the anode for initial or further use without necessarily altering the operation in other cells in the series.

The times at which a cell in use will be treated according to the invention will vary according to its service time in the cell. It will also depend upon the character of the feed and, particularly, upon the electrolyte, the operation being performed, and the material of construction of the anode.

By watching the voltage visually or automatically, a decision can be made for each cell. With a cell normally operating at, say, 8 volts potential drop across the cell, a 10 volt reading usually indicates incipient anode effect. At such a time the voltage can be raised to, say 20 volts, to polarize the anode which then is followed by depolarization as herein described.

One skilled in the art will understand that the cells can be monitored, say, automatically, and the invention applied to each as needed or at regularly established intervals of time.

If for any reason a new cell is installed in a series of cells, it can be treated according to the invention when installed or soon thereafter or later as described.

Referring to the drawing there are shown diagrammatically a main power supply source 1 connected in series through a series of cells 2, 3, 4, 5, 6, 7, 8,...x. This power supply delivers 30,000 amperes with a capacity of 300–360 volts. Conditions in cell 7 are at the stage at which the polarization-depolarization sequence is desirably employed to reduce undesirable operation of cell 7 as evidenced by, say, undesirable byproduct formation as in the electrochemical fluorination of ethylene dichloride or as observed by the voltage increase and/or fluctuations across the cell. Frequently, the signal of a malfunctioning cell is the appearance of "black product," that is, a carbon-containing cell effluent.

An auxiliary or secondary power supply 10 capable of 15,000 amperes delivered at up to 20 volts is connected into and through cell 7 by closing switch 11 and turning on the output of supply 10. Switch 11 remains closed for a time sufficient to cause maximum anode effect to occur. The 30,000 plus 15,000 amperes, i.e., 45KA, induces the polarization or maximum anode effect in the cell 7 in about 1 minute. This is evidenced by a rapid rise in cell voltage. Upon switching off supply 10 the main power supply then proceeds with the depolarization of the cell at 30,000 amperes and at about 40–60 volts for that particular cell. The abnormally high cell voltage is allowed to continue for 1.5 minutes. To break loose the anode and restore normal operating conditions, the shorting switch 12 is momentarily closed, the auxiliary power supply 10 remaining turned off, the cell momentarily ceasing to carry a current. After a few seconds the shorting switch 12 is again opened and the cell is found to operate smoothly at normally low cell voltage and with minimum byproduct formation.

Thus, the drawing illustrates an electrochemical conversion process which fluorinates ethylene dichloride to dichlorotetrafluoroethane (Freon 114) and which uses 30 cells in series with the above-described 30,000 ampere power supply. The power supply is on current control and its voltage output will automatically vary, within its voltage capacity limits, to the degree required to maintain the 30,000 ampere level. Each cell is equipped with iron screen cathodes and an array of 30 cylindrical anodes operating in parallel to each other. The anodes have a geometric surface area of 4 square feet each and are fabricated using a porous carbon having an average pore diameter of about 120 angstroms and a permeability of about 30,000 darcys. The vaporized ethylene dichloride feed is delivered to a dome in the bottom of each anode. The vapors flow upward through the porous carbon anode and exit the anode at a point above the surface of the electrolyte. The electrolyte consists of molten $KF \cdot 2HF$ maintained at about $98°$ C. Hydrogen is evolved at the cathode. The average cell voltage is about 8.5 volts. The feed rate is such that 30 percent of the hydrogens are converted per pass.

Incompletely fluorinated products are separated from the cell effluent and are recycled to the fluorination zone.

Individual cells are periodically conditioned, such as the conditioning of cell 7 described above, to maintain the overall conversion of ethylene dichloride to the Freon 114 product at a selectivity of about 87 percent. By-products are heavy materials, mono- and trichloro products and a small amount of carbon tetrafluoride and other trace materials.

The advantages of the above procedure are readily seen: Individual cells can be beneficially treated, when required to maintain the high performance of the process, without significantly disturbing other normally operating cells;

only those cells which actually require the polarization-depolarization sequence are given the treatment; the entire circuit of 30 cells need not be designed and built to have the expensively high current carrying capacity required for the polarization stage in the treatment of individual cells on an intermittent basis.

Reasonable variation and modification are possible within the scope of the foregoing disclosure, the drawing and the appended claims to the invention the essence of which is that a cell in a series of electrochemical cells is subjected to anode effect or polarization followed by depolarization employing an auxiliary source of current supply fed to the cell in parallel, as described, and that the cell can be broken loose after the auxiliary supply has been shutoff by momentarily shorting the cell out from the main current supply passing through the series of cells.

I claim:

1. A method for treating a cell in a series of electrochemical cells being maintained in operation by a main current supply without disturbing the operation in the remaining cells of the series which comprises subjecting the cell to an additional flow of current, from an auxiliary power supply connected into said cell in parallel with the main supply operating said cell in the series, for a time period adapted to deliberately induce anode effect and then returning the cell to operation with only the main supply of current, the main supply of current being capable of delivering the current utilized in said cell at a voltage higher than that normally required by said cell so that current will flow across said cell when said auxiliary power supply is turned off.

2. A method according to claim 1 wherein when the auxiliary power supply has been shutoff, the cell is momentarily shorted out from the series so that substantially no current is passing therethrough to cause virtually immediate drop of voltage across the cell to the usual or normal value when the cell has been reinstated into the series and the main current supply is again being passed therethrough.

3. A method according to claim 1 wherein the cells in the series of cells are placed into operation at different times so that the treatment of claim 1 will ordinarily be effected for a cell at a time different from that for another cell.

* * * * *